United States Patent
Spietschka et al.

[11] 3,767,357
[45] Oct. 23, 1973

[54] MIXTURE OF QUINOPHTHALONE DISPENSE DYESTUFFS

[75] Inventors: Ernst Spietschka, Oberauroff/Taunus; Friedrich Ische, Naurod/Taunus; Hubert Kruse, Kelkheim/Taunus, all of Germany

[73] Assignee: Farbwerke Hoechst Aktiengesellschaft vormals Meister Lucius & Bruning, Frankfurt/Main, Germany

[22] Filed: May 20, 1971

[21] Appl. No.: 145,511

[30] Foreign Application Priority Data
May 23, 1970 Germany................... P 20 25 288.4

[52] U.S. Cl................................ 8/25, 8/4, 260/289
[51] Int. Cl............................................. D06p 1/16
[58] Field of Search........................ 8/25; 260/289

[56] References Cited
UNITED STATES PATENTS
3,036,876  5/1962  Schoellig et al. ................... 8/25 X FOREIGN PATENTS OR APPLICATIONS
1,168,862  4/1964  Germany

*Primary Examiner*—George F. Lesmes
*Assistant Examiner*—Patricia C. Ives
*Attorney*—Curtis, Morris and Safford

[57] ABSTRACT

A mixture consisting of two dyestuffs in a ratio of from 10 : 90 and 90 : 10% by weight of the general formula

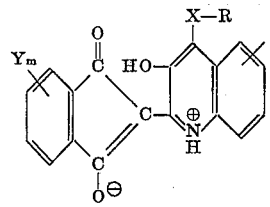

wherein X represents an oxygen atom of a sulfur atom or a sulfonyl group, R represents an aryl group, an aliphatic or a heterocyclic group, Y represents a hydrogen atom, a halogen atom, a nitro group or a phenyl group, Z represents a hydrogen or halogen atom, $m$ is an integer from 1 to 4 and $n$ is the integer 1 or 2 and which differ in at least one meaning of X, R, Y and Z.

These dyestuff mixtures dye synthetic fibrous materials, in particular polyethene terephthalate, yellow shades of good fastness to washing, solvents and light as well as to hot processing and to thermofixation. They are especially useful for the dyeing of wound packages.

6 Claims, No Drawings

MIXTURE OF QUINOPHTHALONE DISPENSE DYESTUFFS

The present invention relates to mixtures consisting of two dyestuffs of the quinophthalone series of the formula

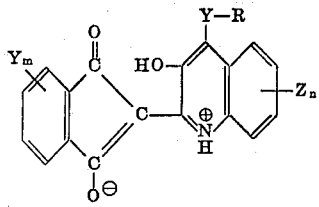

wherein

X represents an oxygen or a sulfur atom or a sulfonyl group,

R represents an aryl group, for example the phenyl or naphthyl group which may be substituted, for example, by an alkyl or alkoxy group preferably containing from one to four carbon atoms, by a halogen atom, especially a chlorine or bromine atom, by a phenyl group or an aralkyl group preferably containing from one to four carbon atoms in the alkyl portion, an alkyl group especially containing from one to four carbon atoms which may be substituted for example, by a hydroxy group or a phenyl group or a heterocyclic group, especially a benzimidazole or benzothiazole group, Y represents a hydrogen atom, a halogen atom, especially a fluorine, chlorine or bromine atom, a nitro group or a phenyl group, Z represents a hydrogen atom or a halogen atom, especially a chlorine or bromine atom, $m$ is an integer from 1 to 4, and $n$ is the integer from 1 or 2, and which two dyestuffs differ at least in one of the meanings of X, R, Y or Z.

This invention also provides a process for the manufacture of these mixtures, which comprises reacting either a quinophthalone derivative of the general formula

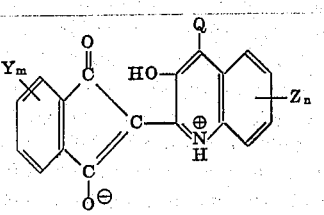

wherein Q represents a chlorine or bromine atom and Y, Z, $m$ and $n$ are defined as above, with a mixture of two compounds of the formula

R − XH wherein X and R are defined as above, and which differ in the meaning of R, in the presence of an alkaline agent, or reacting two quinophthalone derivatives of the formula

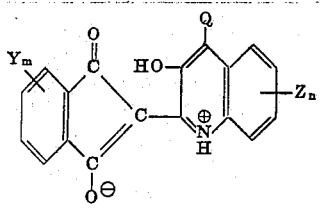

wherein Q, Y Z, $m$ and $n$ are defined as above, and which differ in at least one meaning of Y or Z with a compound of the formula

R − XH wherein R and X are defined as above, in the presence of an alkaline agent.

The weight ratio of the two components may be varied within a wide range, from about 10 to 90% by weight of one component. The ratio in which both components are present in nearly equal molar weight ratios is preferred.

Suitable quinophthalone derivatives are, for example, 4-bromo-3-hydroxy-quinophthalone, 4-chloro-3-hydroxy-quinophthalone, 4, 5',6'-tribromo-3-hydroxy-quinophthalone, 4,4',5',6',7'-pentabromo-3-hydroxy-quinophthalone, 4-bromo,4',7'-dichloro-3-hydroxy-quinophthalone, 4-bromo-4',5',6',7'-tetrachloro-3-hydroxy-quinophthalone, 4-bromo-4'-fluoro-3-hydroxyquinophthalone, 4-bromo-5'-nitro-3-hydroxy-quinophthalone, 4,6-dibromo-3-hydroxy-quinophthalone, 4-bromo-5,7-dichloro-3-hydroxy-quinophthalone and 4-bromo-5'-phenyl-3-hydroxy-quinophthalone. These quinophthalone derivatives may be obtained according to Belgian Patent Nos. 733,604 and 733,605. Suitable compounds of the formula R-XH are, for example, phenol, alkyl phenols, such as 4-hydroxy-toluene, halogen phenols, such as 4-bromo-phenol, 2-chloro-phenol, 4-fluoro-phenol, polyhydric phenols, such as hydroquinone, hydroquinone-monomethyl ether, nitrophenols, such as 4-nitrophenol, hydroxydiphenyl-methanes, hydroxydiphenyls, naphthols, alcohols, such as methanol, ethanol, hexanol, glycol, benzyl alcohol, mercapto compounds, such as thiophenol, 4-chloro-thiophenol, 2,5-dichloro-thiophenol, ethyl-mercaptan, 2-mercaptobenzothiazole, sulfinic acids, such as benzene sulfinic acid, 4-chloro-benzene-sulfinic acid, ethane-sulfinic acid and similar compounds. If the sodium salts of the sulfinic acids are used, the addition of the alkaline agent can be dispensed with. If mercapto compounds are reacted in slightly basic solvents, such as dimethyl formamide, no further alkaline agent is necessary. Otherwise, sodium hydroxide, potassium carbonate or sodium carbonate solution, for example, are used as alkaline agent.

The reaction is advantageously carried out in a suitable, inert solvent, for example, dimethyl formamide, dimethyl sulfoxide, N-methyl acetamide or phosphoric acid tris-dimethyl amide or in an excess amount of the compounds of the formula R-XH. If the reaction is carried out with mercapto compounds or sulfinic acids, alcohols, for example amyl alcohol, isobutanol or glycol may also be used as solvents.

The reaction temperature is advantageously within the range of from 100° to 200° C, preferably from 100° to 140° C. The course of the reaction can be easily observed by means of the thin layer chromatography.

The dyestuffs are advantageously isolated by pouring the reaction mixture in water, into dilute mineral acid or lower alcohols, for example methanol, and suction-filtering the precipitated dyestuff. The dyestuff mixtures are finely dispersed advantageously by grinding in bead mills, roller mills or vibration mills or by kneading in dispersion kneaders or by dispersing in impellers, preferably in the presence of a dispersion agent, for example, the condensation product of formaldehyde and 2-naphthol-6-sulfonic acid.

The dyestuff mixtures manufactured in accordance with the invention dye synthetic fibrous materials in particular polyethylene terephthalate, yellow shades of good fastness to washing, solvents and light as well as to hot processing and to thermofixation. In comparison to individual dyestuffs which are described in Ger. Pat. Nos. 1,168,862 and 1,619,348, the present claimed mixtures thereof are distinguished by their more favourable properties in the dyeing of wound packages. While the individual dyestuffs tend to deposit and produce dyeings of poor fastness to rubbing, the dyestuff mixtures according to the invention do not have these drawbacks.

To manufacture fast dyeings the polyester materials are treated in the presence of a carrier at a temperature within the range of from 80° to 110° C or in the absence of a carrier at a temperature within the range of from 110° to 140° C with the corresponding dyestuff mixtures. For printing, aqueous printing pastes are printed on the polyester fabric which is subsequently fixed in the presence of a carrier material at a temperature within the range of from 95° to 110° C or in the absence of a carrier material at a temperature within the range of from 120° to 140° C.

Dyeing and printing may also be carried out according to the Thermosol process in which the padded or printed material is treated briefly with dry heat at a temperature within the range of from 180° to 200° C.

The following Examples illustrate the invention, the parts and percentages being by weight unless otherwise stated.

EXAMPLE 1

45 parts of 4-bromo-3-hydroxy-quinophthalone were dissolved in 200 parts of dimethylformamide to which a mixture of 12.2 parts of the sodium salt of benzene-sulfinic acid and 14.8 parts of the sodium salt of 4-chloro-benzene-sulfinic acid was added. The mixture was heated at 150° C until there was no more starting material present. Then, the mixture was cooled to room temperature and diluted with 800 parts of water. The resulting dyestuff mixture was suction-filtered, washed with water and dried.

60 parts of a nearly equimolar mixture of the dyestuffs of the formula

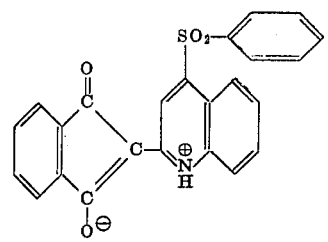

and of the formula

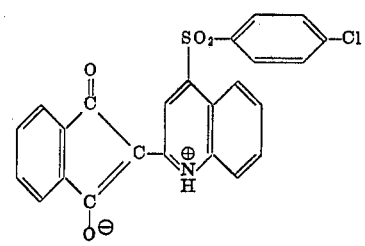

were obtained.

The mixture dyes fibers, sheets and films made from polyethylene terephthalates yellow shades of very good fastness properties. In particular, wound packages are dyed without deposits and with fastness to rubbing.

The following dyestuff mixtures were obtained in the same way:

| Starting products | Reaction products | Shade |
|---|---|---|
| 2 mols 4,5′,6′-tribromo-3-hydroxy quinophthalone, 1 mol 4-hydroxy-toluene, 1 mol hydroquinone-mono-methyl-ether. | $R = $ —⟨⟩—$CH_3$  and  —⟨⟩—$OCH_3$ | Yellow. |
| 2 mols 4-bromo-4′-fluor-3-hydroxy quinophthalone, 1 mol 4-hydroxy-diphenyl, 1 mol 4-hydroxy-diphenylmethane. | $R = $ —⟨⟩—⟨⟩  and  —⟨⟩—$CH_2$—⟨⟩ | Do. |
| 2 mols 4-bromo-5′-nitro-3-hydroxy-quinophthalone, 1 mol 1-naphthol, 1 mol 2-naphthol. | $R = $ naphthyl isomers | Reddish yellow. |

The following dyestuff mixtures were obtained in the same way:

| Starting products | Reaction products | Shade |
|---|---|---|
| 2 mols 4-bromo-5,7-dichloro-3-hydroxy-quinophthalone, 1 mol ethanol, 1 mol glycol. | $R = C_2H_5$ $+-CH_2-CH_2-OH$ | Yellow. |
| 2 mols 4-bromo-5'-phenyl-3-hydroxy-quinophthalone, 1 mol 2-mercapto-benzimidazole, 1 mol 2-mercapto-benzthiazole. | (benzthiazole and benzimidazole R groups) | Do. |
| 2 mols 4-bromo-3-hydroxy-quinophthalone, 1 mol phenol, 1 mol thiophenol. | $X-R = -O-C_6H_5$ $Y-S-C_6H_5$ | Do. |

EXAMPLE 2

36.8 Parts of 4-bromo-3-hydroxy-quinophthalone, 8 parts of 4-chloro-thiophenol, 10 parts of 2,5-dichloro-thiophenol, 14 parts of anhydrous potassium carbonate and 200 parts of isobutanol were boiled for 3 hours. Then the mixture was cooled, diluted with 200 parts of methanol, suction-filtered, washed with methanol and then with water and dried.

41 Parts of the nearly equimolar mixture of the dyestuff of the formula

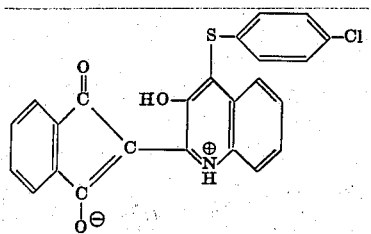

and of the formula

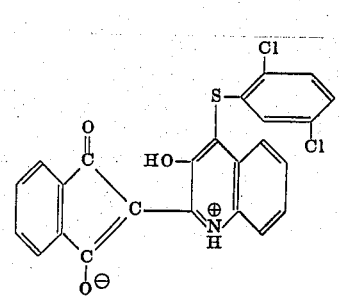

were obtained.

The mixture dyes fibers, sheets and films from polyethylene-terephthalate yellow shades of very good fastness properties, in particular of good fastness to rubbing in the case of wound packages.

EXAMPLE 3

36.8 Parts of 4-bromo-3-hydroxy-quinophthalone were introduced within one hour at a temperature within the range of from 120° to 130° C in a melt of 50 parts of phenol, 68 parts of 4-chloro-phenol and 12 parts of potassium hydroxide. The mixture was heated for another hour at 120° – 130° C and then the melt was poured in 500 parts of methanol. The dyestuff mixture was suction-filtered, washed with methanol and then with water and was dried.

36 Parts of the dyestuff mixture of formula

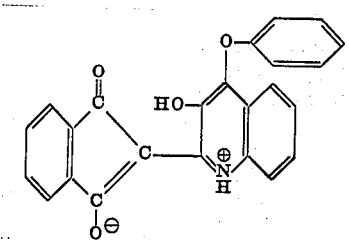

and of formula

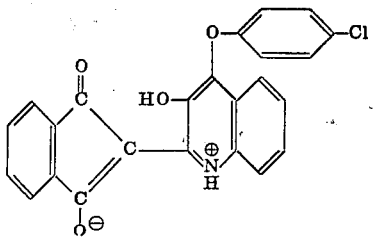

were obtained.

The dyestuff mixture dyes fibers, sheets and films from polyterephthalates shades of very good fastness properties, in particular of a very good fastness to rubbing in the case of wound packages.

EXAMPLE 4

18.4 Parts of 4-bromo-3-hydroxy-quinophthalone, 22.4 parts of 4,6-dibromo-3-hydroxy-quinophthalone and 20 parts of 2,5-dichloro-thiophenol were heated at 140° C in 200 parts of dimethyl-formamide until it could be observed by means of the thin layer chromatography that the reaction had been completed.

Then the mixture was cooled and diluted with 500 parts of water. The dyestuff mixture was suction-filled, washed and dried.

40 Parts of the dyestuff mixture of formula

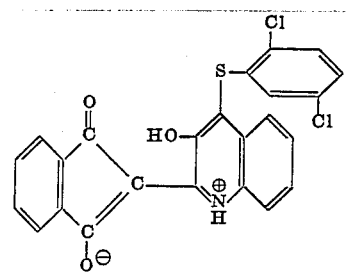

and of formula

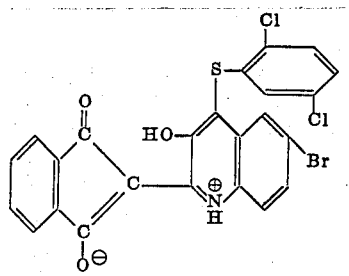

were obtained.

The mixture dyes fibers and sheets and films from poly-ethylene-terephthalates shades of very good fastness properties, in particular of very good fastness to rubbing in the case of wound packages.

In the same way, a dyestuff mixture of formula

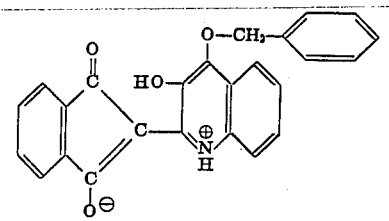

and of formula

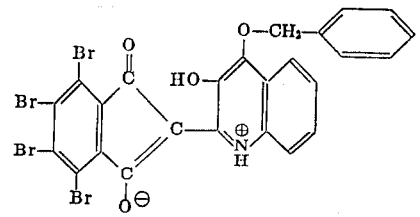

was obtained from
1 mol of 4-bromo-3-hydroxy-quinophthalone, 1 mol of 4,4',5', 6', 7'-pentabromo-3-hydroxy-quinophthalone and 2 mols of benzyl alcohol
and a dyestuff mixture of formula

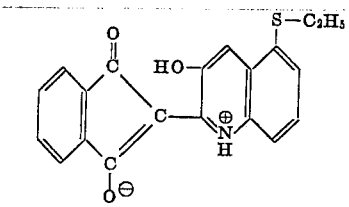

and of formula

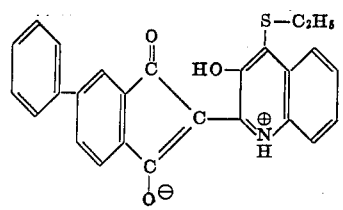

was obtained from
1 mol of 4-bromo-3-hydroxy-quinophthalone, 1 mol of 4-bromo-5'-phenyl-3-hydroxy-quinophthalone and 2 mols of ethyl mercaptan.

We claim:
1. A mixture of from about 10% to about 90% by weight of two dyestuffs each of the quinophthalone series of the formula

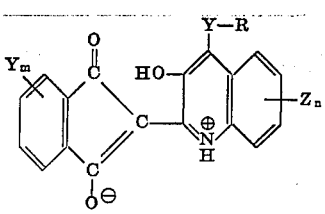

wherein X is -O-, -S- or -$SO_2$-, R is benzimidazolyl, benzthiazolyl, naphthyl, phenyl, biphenyl, phenyl lower alkyl phenyl or phenyl substituted by one to four members of the group lower alkyl, lower alkoxy, chlorine and bromine, Y is hydrogen, chlorine, bromine, nitro or phenyl, Z is hydrogen, chlorine or bromine, $m$ is an integer of 1 to 4, provided that $m$ is 1 where Y is nitro or phenyl and $n$ is an integer of 1 or 2, which dyestuffs differ by at least one of X, R, Y or Z.

2. A mixture according to claim 1 wherein said dyestuffs are present in substantially equal amounts.

3. A mixture according to claim 1 wherein X is $-SO_2-$, one R is phenyl and the other is chlorophenyl, Y is hydrogen and Z is hydrogen.

4. A mixture according to claim 1 wherein X is -S-, one R is chlorophenyl and the other is dichlorophenyl, Y is hydrogen and Z is hydrogen.

5. A mixture according to claim 1 wherein X is -O-, one R is phenyl and the other is chlorophenyl, Y is hydrogen and Z is hydrogen.

6. A mixture according to claim 1 wherein X is -S-, R is dichlorophenyl, Y is hydrogen, one Z is hydrogen and the other is monobromo.

\* \* \* \* \*